W. M. REYNOLDS.
Assignor to S. S. WHITE.
Dental-Drill.
No. 8,409. Reissued Sept. 10, 1878.
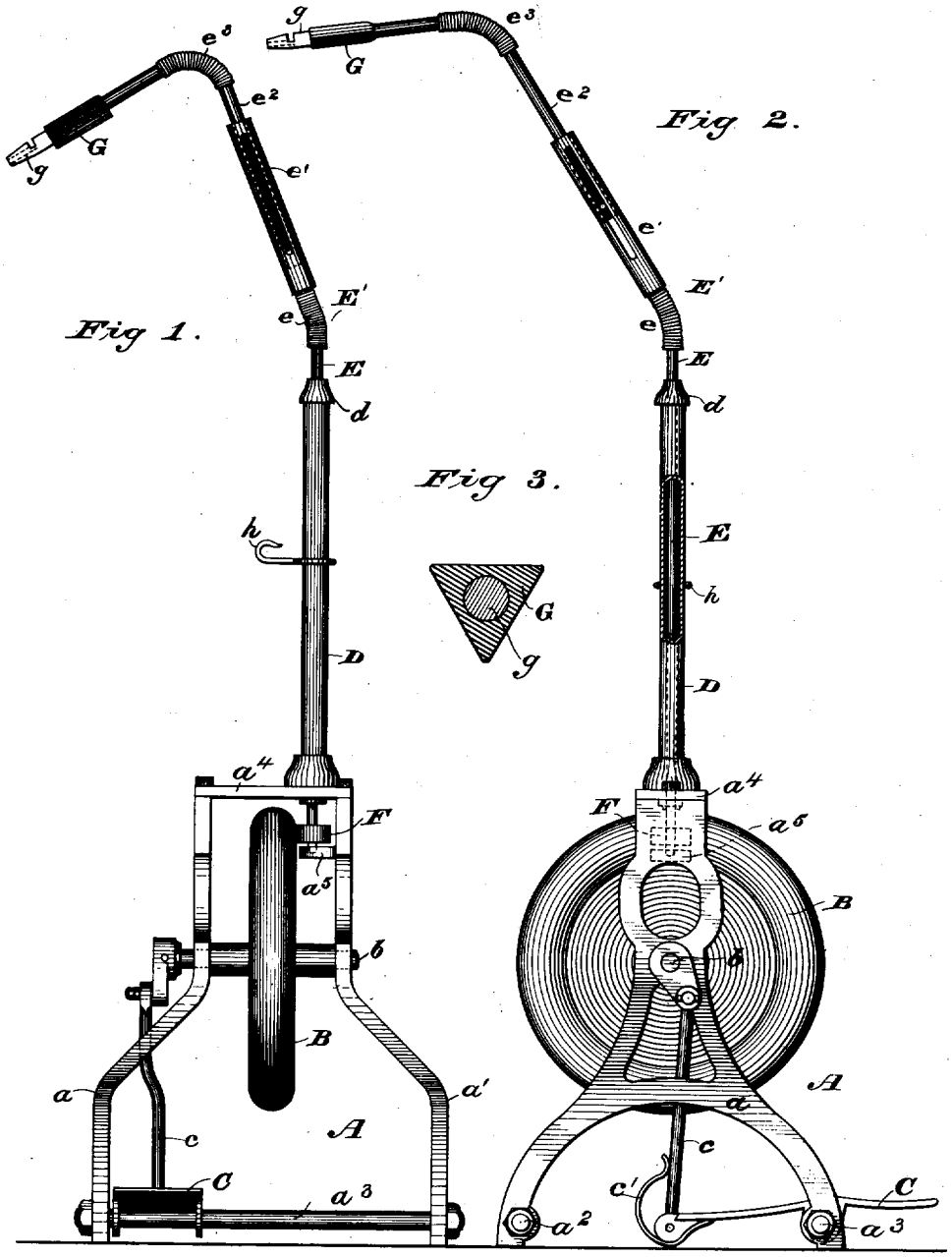
WITNESSES
Wm A Skinkle
Geo W Breck.
INVENTOR
William M. Reynolds.
By his Attorneys
Baldwin, Hopkins & Peyton

UNITED STATES PATENT OFFICE.

WILLIAM M. REYNOLDS, OF NEW YORK, N. N., ASSIGNOR TO SAMUEL S. WHITE, OF PHILADELPHIA, PA.

IMPROVEMENT IN DENTAL DRILLS.

Specification forming part of Letters Patent No. 127,269, dated May 28, 1872; Reissue No. 8,409, dated September 10, 1878; application filed August 14, 1878.

*To all whom it may concern:*

Be it known that I, WILLIAM M. REYNOLDS, of the city, county, and State of New York, have invented certain new and useful Improvements in Dental Drills, of which the following is a specification:

My invention relates to dental engines of that class in which is combined a base or stand, a standard or arm rising from the base, a flexible driving-shaft extending from the standard or arm and imparting motion to an operating-tool, whereby it is given a wide range of movement in various directions, and a foot-treadle and its fly-wheel or other motor.

Heretofore motion has been communicated to the flexible driving-shaft from the fly-wheel of the treadle by means of cords, bands, and pulleys; but experience has demonstrated objections to exist to the employment of belts and cords, now too well known to need recital.

The object of my invention is to dispense with driving belts, cords, and pulleys, and impart a steady continuous motion to the flexible driving-shaft carrying the operating-tool without undue friction, noise, or loss of power, and to furnish a simple and effective engine or lathe, whereby a wide range of movement is given to the operating-tool to facilitate the skillful performance of dental operations.

My invention therefore consists, first, in combining a base or stand, a treadle or motor mounted thereon, a fly-wheel also mounted in or upon the base, and an upright or vertical shaft driven or rotated by the wheel through the medium of gearing; secondly, in combining a base or stand, a treadle, a fly-wheel, an upright or vertical shaft driven by the wheel through the medium of gearing, and a flexible extension or shaft driven by the upright shaft; thirdly, in combining a base or stand, a treadle, a fly-wheel, an upright or vertical shaft driven by the wheel through the medium of gearing, a flexible extension or shaft driven by the upright shaft, and a rotary instrument-holder or chuck adapted for the reception of operating-tools; fourthly, in combining a base or stand, a treadle, a driving-wheel, a tubular arm or standard rising from the base, an upright shaft turning in the tubular standard, driving-connections between the driving-wheel and upright shaft, a flexible extension or shaft driven by the upright shaft, and a hand-piece or tool-carrier; fifthly, in constructing the flexible rotating power-driven shaft of a dental engine, which carries the operating-instrument or hand-piece, in sections, one of which is extensible on the other, whereby a greater or less length of shaft and greater or less range of movement of the operating-tool may be obtained; sixthly, in providing the upright arm or standard of a dental engine with a securing or attaching device adapted for the reception of the hand-piece or handle, carried by the flexible portion or shaft of the engine, to keep it out of the way when the machine is at rest; seventhly, in combining a dental-engine handle or hand-piece casing, provided with flat sides or surfaces, with a rotary tool chuck or holder mounted therein, and adapted for the reception of operating-tools; eighthly, in combining a dental-engine handle or hand-piece casing, provided with flat sides or surfaces, a rotary tool chuck or holder mounted therein, and a flexible shaft for driving the tool-holder.

In the accompanying drawing, forming part of this specification, Figure 1 is a front elevation of my improved engine; Fig. 2, a side elevation thereof; and Fig. 3, a section through the handle or tool-carrier and the tool holder or chuck.

The base or stand A is shown as consisting of two side frames, $a$ $a^1$, secured together and braced at the lower part or feet, in front and rear, by stay-bolts $a^2$ $a^3$, and at the top by a cap or cross-bar, $a^4$.

A driving or fly wheel, B, is mounted on a shaft, $b$, having its bearings in the base, and is made to revolve by the action of the foot upon a treadle, C, which is connected by a pitman, $c$, with a crank on the fly-wheel shaft.

The treadle rocks on the stay-bolt $a^3$ by means of suitable lugs on the under side of it, through which the bolt passes.

A spring, $c^1$, for the purpose of throwing or moving the crank-pin off the "dead-center," is applied to the treadle and pitman, one end being secured to the treadle C and the other bearing against the connecting-rod or pitman.

Rising from the base or stand is an upright or vertical arm or standard, D, made hollow or tubular, for the reception of a shaft, E, having its upper bearing in the piece or box *d*, mounted on top of the engine-arm, and its lower bearing in a lug, $a^5$, projecting from the inside of the base or stand, the lower end of this vertical shaft passing through a suitable socket formed in the cap $a^4$.

Rotary motion is communicated to the shaft E from the driving-wheel B by means of gearing consisting of a suitable friction-wheel mounted on the upright shaft and bearing against the surface of the driving-wheel. This friction gear-wheel is preferably made of india-rubber or other elastic material, in well-known ways.

Upon the upper end of the vertical shaft E is fastened or connected a flexible extension or shaft, E′. (Shown as consisting of a universal joint or short shaft, *e*, of coiled wire, one end of which is secured directly to the upper end of the vertical driving-shaft, while its opposite end is connected with a tubular or hollow stiff-section, *e′*, in which slides or telescopes freely another short stiff section or rod, *e″*.) The telescoping or extensible sections are prevented from turning independently by a pin on section $e^2$, working in a slot cut longitudinally in the wall of the hollow part or section $e^1$. A second universal joint or short shaft, $e^3$, of coiled wire, is connected at its inner end with the outer end of the telescoping section $e^2$, and at its outer end is connected with and imparts rotary motion to an instrument-holder or chuck, *g*, mounted in bearings in a handle, hand-piece, or tool-carrier, G.

The hand-piece or handle is constructed with flat sides or surfaces, being shown in the drawing as three-sided, or of a triangular shape in cross-section, so as to adapt it to be held more securely in the hand and permit of nicer and more delicate operations being performed, as it does not turn in or tire the hand, the thumb and fingers lying along the squared faces of the handle in a perfectly natural and free position.

The universal joints of the flexible shaft or extension are shown as consisting of short flexible coiled-wire shafts, of well-known construction; but they may be made of rubber tubing; or, if preferred, the ordinary universal joint may be used.

In order to provide convenient means for securing and holding the hand-piece and flexible shaft out of the way of the operator when the machine is at rest or not in use, I mount upon the upright arm or standard of the engine a securing or attaching device, (shown in the drawings as consisting of a hook, *h*,) in which the hand-piece is pressed or inserted.

It will thus be seen from the foregoing description of the embodiment of my invention that I dispense with all belts, cords, and their attendant pulleys, and drive the flexible shaft through the medium of a vertical shaft inclosed in the engine-arm, the treadle being the prime mover, whereby the operating-tool is driven with a steady continuous motion, without undue friction, noise, or loss of power, and with none of the disadvantages incident to the employment of belts and cords as driving mediums.

By the addition of the extensible feature of my rotating power-driven flexible shaft I am also enabled to give the operating-tool a wider range of movement, and with more ease to the operator, than if the shaft were merely flexible, and that by the simple telescoping of the sections which carry the chuck.

I claim as my invention—

1. The combination, substantially as hereinbefore set forth, of the base or stand, the treadle or motor, the fly-wheel, and the upright or vertical shaft driven by the fly-wheel through the medium of gearing.

2. The combination, substantially as hereinbefore set forth, of the base or stand, the treadle, the fly-wheel, the upright or vertical shaft driven by the fly-wheel through the medium of gearing, and the flexible extension or shaft driven by the upright shaft.

3. The combination, substantially as hereinbefore set forth, of the base or stand, the treadle, the fly-wheel, the upright or vertical shaft driven by the fly-wheel through the medium of gearing, the flexible extension or shaft driven by the upright shaft, and the rotary instrument-holder or chuck adapted for the reception of operating-tools.

4. The combination, substantially as hereinbefore set forth, of the base, the treadle, the fly-wheel, the tubular arm or standard rising from the base, the upright shaft turning in the tubular standard, the driving-connections between the fly-wheel and upright shaft, the flexible extension or shaft, and the hand-piece or tool-carrier.

5. The flexible rotating power-driven shaft constructed, substantially as hereinbefore set forth, in sections, one of which is extensible on the other, whereby a greater or less length of shaft and a greater or less range of movement of the operating-tool driven thereby are obtained.

6. The combination of the upright arm or standard with a securing or attaching device mounted thereon, and adapted for the reception of the hand-piece or handle carried by the flexible shaft or portion of the engine, to keep it out of the way when the machine is at rest.

7. The combination, substantially as hereinbefore set forth, of the handle or hand-piece casing, provided with flat sides or surfaces, with a rotary tool-holder mounted therein and adapted for the reception of operating-tools.

8. The combination, substantially as hereinbefore set forth, of the handle or hand-piece casing provided with flat sides or surfaces, a rotary tool-holder mounted therein and adapted for the reception of operating-tools, and the flexible shaft to drive the tool-holder.

WM. M. REYNOLDS.

Witnesses:—
EDW. H. SARGENT,
S. E. PAGE.